July 19, 1938.  F. W. COTTERMAN  2,123,933
MOTOR CONSTRUCTION
Filed Aug. 14, 1937
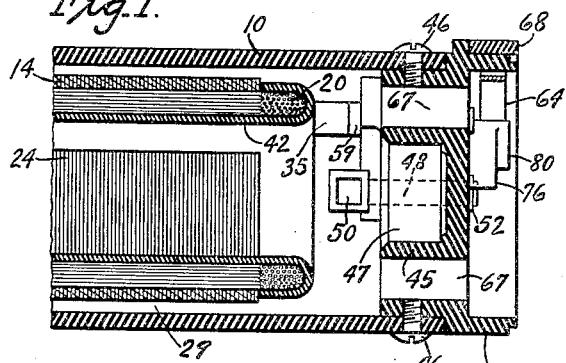
Fig. 1.
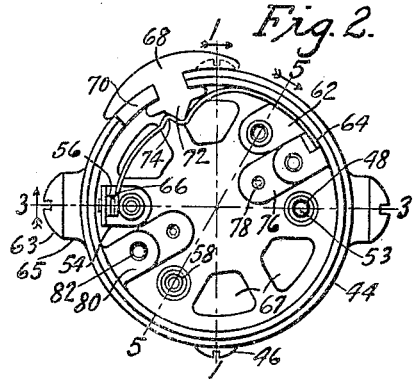
Fig. 2.
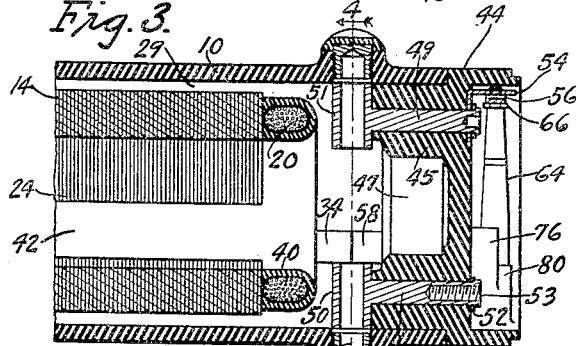
Fig. 3.
Fig. 4.
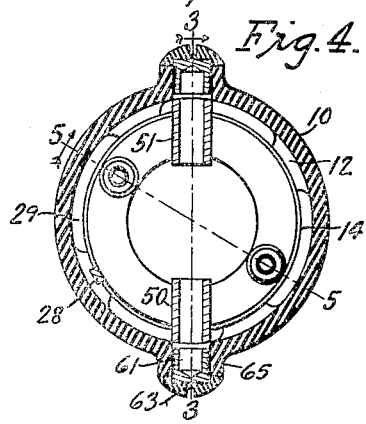
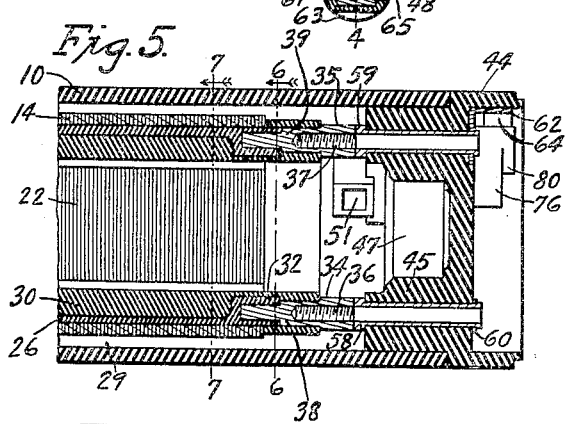
Fig. 5.
Fig. 6.
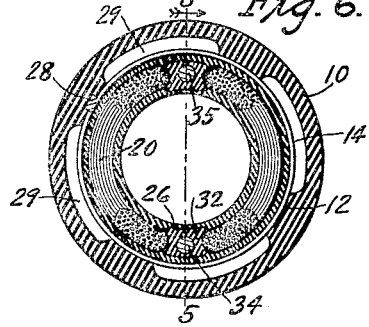
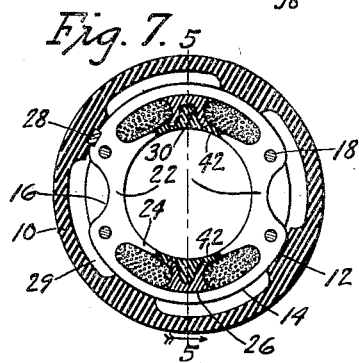
Fig. 7.
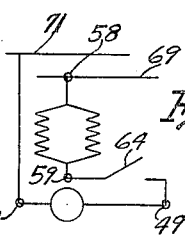
Fig. 8.
INVENTOR
Frederick W. Cotterman Patented July 19, 1938

2,123,933

UNITED STATES PATENT OFFICE 2,123,933

MOTOR CONSTRUCTION

Frederick W. Cotterman, Dayton, Ohio, assignor to Bessie D. Apple, Dayton, Ohio

Application August 14, 1937, Serial No. 159,134

8 Claims. (Cl. 171—252)

The structure herein shown relates to electric motors and particularly to the field, brush holders and switch.

An object to be achieved is to provide a structure wherein the field winding is so supported that it may not be displaced and injured from vibration of the motor.

Another object is to so enclose the winding in an insulating jacket as to prevent oil, moisture or dirt entering between the turns thereof.

Another object is to eliminate all flexible leads which normally extend from a field winding for electrically connecting to other parts of the motor, by providing rigid terminal posts for the field winding which are permanently secured to the core and winding structure and all enclosed in the jacket except the ends of the posts which protrude from the jacket to provide for electrical connection.

Another object is to provide an end enclosing head of insulating material which carries the motor bearing for one end of the armature and has secured therein rigid brush holders, line connection posts and switch posts so connected that the simple act of securing the head and field terminal posts together by means of screws makes all electrical connections without any wires or leads, which could be broken off, being accessible.

Another object is to provide a motor which is generally more quickly and easily assembled than motors of common practice.

Other objects and meritorious features will become apparent as the structure is described in greater detail and reference is made to the drawing, wherein, Fig. 1 is an axial section through the structure taken on the line 1—1 of Fig. 2.

Fig. 2 is an end view of Fig. 1.

Fig. 3 is an axial section through the structure taken on lines 3—3 of Fig. 2 or 4.

Fig. 4 is a transverse section taken at 4—4 of Fig. 3.

Fig. 5 is an axial section taken at 5—5 of Fig. 2, 4, 6 or 7.

Fig. 6 is a transverse section taken at 6—6 of Fig. 5.

Fig. 7 is a transverse section taken at 7—7 of Fig. 5.

Fig. 8 is a circuit diagram of the structure.

In the drawing, the motor body 10 is molded insulation. Ribs 12, Fig. 6, extend inwardly from the body wall to centrally support the field core 14.

The field is bipolar and the core is built up of a plurality of laminae of the outline 16, Fig. 7, held together by rivets 18. A coil 20 surrounds each pole 22. The coils are held in place under the pole tips 24 by the wedges 26. A key 28 holds the field core in correct relation to the body. The spaces 29 between the core 14 and body 10 are provided for ventilation.

The wedges 26, Figs. 5 and 7 are of insulation and have concave grooves in opposite edges to fit over the rounded coil sides and press them back under the pole tips 24. A channel 30 extends lengthwise of the wedge for the greater part of its length but does not extend all the way to the end thereby leaving thickened ends 32, Figs. 5 and 6, in which the metal terminal posts 34 and 35 are held.

If the wedges 26 are molded, the posts 34 and 35 may be molded in as inserts in the usual manner. Posts 34 and 35 are tapped as at 36 and 37 at their outer ends.

In placing the coils 20 on the core 14 and securing them in place with the wedges 26, the coils should preferably be well saturated with a liquid insulation and the wedges coated with the same or a similar material before they are pressed into place. A gauge should preferably be used so that the wedges may be pressed to an exact depth. The liquid insulation should now be allowed to air dry, then opposite ends of the field coils connected by soldering to the terminal posts preferably about at the points 38 and 39, Fig. 5. When this has been done, the core, coil and wedge assembly should be thoroughly baked to harden the liquid insulation and cement the several parts in rigid relation to each other.

It will be seen that the wedges 26 comprise at the same time a pair of rigid terminal members to which the field coil ends are connected and a pair of coil wedges for holding the field coil sides back under the pole tips, and while the wedge structure shown may be a preferred arrangement, it should be understood that the proportion of metal to insulation may vary greatly, or the entire wedge structure may be of metal if it is sufficiently coated with insulation where it bears against the coil sides or is otherwise sufficiently insulated therefrom, and while the members 26 are termed wedges, they are not necessarily tapered from one end to the other, but are so called because they wedge the coil sides apart and back under the pole tips.

After the field element is thus baked, it is preferably placed in a mold and a jacket of insulation molded around it and cured in the mold. The mold should be so made that the jacket when molded shall comprise, in one piece, the complete covering for the coil ends at each end of the core, as at 40, Fig. 3, and a covering over the coil sides, where they are not covered by the pole tips, as at 42, Figs. 1 and 7. The insulation may be any kind which will not soften from the heat incident to the operation of the motor after the jacket is once cured, and which may be softened sufficiently when it is being molded to flow into the relatively thin sections which comprise the jacket. The channel 30 provides additional space through which the softened insulation may flow from one end of the core to the other while it is being molded.

The bearing head 44 carries a central hub 45 having a central opening 47 for a ball bearing and is also of molded insulation. It slips into the end of the motor body 10 to a shoulder and is held by the screws 46. Into holes extending longitudinally through the bearing head, the stems 48 and 49 of two brush holders 50 and 51, Fig. 3, are pressed. A washer 52 is placed over the outer end of one of these stems and a right angle bracket 54 carrying the switch contact 56 is placed over the other. The stems 48 and 49 are then riveted to hold the washer and bracket in place. The stem 48 is tapped at 53. Into other holes extending longitudinally through the head, the two tubes 58 and 59, Fig. 5 are pressed. A washer 60 is placed over the outer end of one of these tubes and the right angle bracket 62 of the switch blade 64 is placed over the other.

The tubes are then slightly riveted over. When the bearing head is in place, the tubes 58 and 59 are in alignment with the field terminal posts 34 and 35 respectively, whereby the insertion of two screws (not shown) through the tubes 58 and 59 into the tapped holes 36 and 37, and the insertion of brushes (not shown) into the box brush holders 50 and 51 makes all necessary electrical connections when the motor is being assembled. Brush caps comprising externally threaded metal cups 61 with moldled insulation screw heads 63 extend through bosses 65 in the body 10. They are provided for holding brush springs (not shown) under tension against the ends of the brushes.

One side 69, of a duplex lamp cord, see Fig. 8, may be put under the screw head which goes into tube 58. The other side 71, of the cord should be secured to the brush holder stem 48 by inserting a screw into the tapped hole 53 and placing the cord under the head of the screw. Openings 67 extend through the bearing head for ventilation.

The switch blade 64, at its free end, carries the switch contact 66. The switch block 68 rests in a slot formed by cutting away the edge of the bearing head as at 70, Fig. 1, whereby circumferential movement of the block operates the switch by movement of the switch lug 72 against the projection 74 in the switch blade.

The bosses 76 and tapped holes 78 are provided for securing any conventional cord clamp usually provided in any electrical appliance to keep the strain off of the cord connections. The other bosses 80 and tapped holes 82 are provided so that a suitable cord cover may be attached.

Such a cover usually has a hole for the cord to enter and other holes to permit cooling air to be drawn into the motor.

Having described the foregoing invention, I claim,

1. In a dynamo electric machine, a magnetizable core having poles, coils on said poles, and members comprising coil holding means and rigid coil terminals held between coil sides of adjacent coils, said coils being electrically connected to said terminals.

2. In a dynamo electric machine, a core of magnetizable material having poles, coils on said poles, and coil wedges between the coil sides of adjacent coils, said wedges having rigid terminal ends to which the coil ends are electrically connected.

3. In a dynamo electric machine, a magnetizable core having poles, coils on said poles, and wedge members carrying electrical terminals at the ends pressed and cemented between coil sides of adjacent poles, said coils being electrically connected to said terminals.

4. The structure defined in claim 3 with a jacket of insulation extending in a single piece around the coil heads at the ends of the core, over the coil sides between the poles and over that portion of the terminals to which the coils are electrically connected.

5. In a dynamo electric machine, a magnetizable core having poles with pole tips, coils on said poles, the coil sides extending under said tips, and wedge members having rigid terminal connectors at the ends, pressed and cemented between the coil sides of adjacent coils, the coils being electrically connected to the said connectors.

6. The structure defined in claim 5, a housing surrounding said structure, a bearing head for said housing, metal conductors imbedded in said head, and means securing said head to said housing with said metal conductors in contact with said rigid terminal connectors.

7. In a dynamo electric machine, a field or stator core having poles with pole tips, coils on said poles having their coil sides under said tips, and wedges of insulation, having tapped metal terminal connectors secured to their ends, said wedges being pressed and cemented between coil sides of adjacent coils thereby holding said coil sides under said pole tips, the coils being electrically connected to said metal terminals.

8. The structure defined in claim 7, a housing surrounding said structure, a bearing head for said housing, hollow metal conductors imbedded in said head, and means securing said head to said housing with said hollow metal conductors axially aligned with said tapped metal terminal connectors.

FREDERICK W. COTTERMAN.